(12) United States Patent
Nishimura

(10) Patent No.: US 8,119,048 B2
(45) Date of Patent: Feb. 21, 2012

(54) HOUSING CASE, METHOD FOR MANUFACTURING HOUSING CASE, AND GLASS INSERT MOLDING DIE USED IN SAME

(75) Inventor: Takeshi Nishimura, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 230 days.

(21) Appl. No.: 12/441,635

(22) PCT Filed: Sep. 20, 2007

(86) PCT No.: PCT/JP2007/068271
§ 371 (c)(1),
(2), (4) Date: Mar. 17, 2009

(87) PCT Pub. No.: WO2008/035736
PCT Pub. Date: Mar. 27, 2008

(65) Prior Publication Data
US 2010/0014232 A1   Jan. 21, 2010

(30) Foreign Application Priority Data

Sep. 22, 2006 (JP) ................................. 2006-258126
Oct. 30, 2006 (JP) ................................. 2006-294799

(51) Int. Cl.
*B29C 70/76* (2006.01)
(52) U.S. Cl. ........ 264/252; 264/275; 264/278; 425/116; 425/125; 425/127

(58) Field of Classification Search .................. 425/116, 425/125, 127; 264/252, 275, 278
See application file for complete search history.

(56) References Cited

U.S. PATENT DOCUMENTS

| 2,137,472 | A | * | 11/1938 | Forbes | 425/116 |
| 3,363,040 | A | * | 1/1968 | Katashi | 264/278 |
| 5,494,615 | A | * | 2/1996 | Wang Lee | 264/1.7 |
| 5,916,600 | A | * | 6/1999 | Dubay et al. | 425/116 |
| 6,120,274 | A | * | 9/2000 | Gerig et al. | 425/116 |
| 6,537,669 | B1 | * | 3/2003 | Kaufmann | 428/411.1 |
| 6,754,971 | B1 | * | 6/2004 | Hagenmeyer et al. | 33/520 |

FOREIGN PATENT DOCUMENTS

| FR | 2643028 A1 | | 8/1990 |
| JP | 01075212 A | * | 3/1989 |
| JP | 1-80418 U | | 5/1989 |
| JP | 01080418 U | * | 5/1989 |
| JP | 2000-194269 | | 7/2000 |
| JP | 2001-036258 | | 2/2001 |

(Continued)

OTHER PUBLICATIONS

Portion of corresponding Japanese office action dated Nov. 2, 2011.*

(Continued)

*Primary Examiner* — Robert B Davis
(74) *Attorney, Agent, or Firm* — The Webb Law Firm

(57) ABSTRACT

A housing case for a small electric device and communication device includes a flat plate having a dimension substantially the same as that of the front portion of the housing case and comprising at least a glass plate, and a resin frame integrated with the flat plate to support the backside periphery of the flat plate.

11 Claims, 18 Drawing Sheets

FOREIGN PATENT DOCUMENTS

| | | | |
|---|---|---|---|
| JP | 2002-12753 A | | 1/2002 |
| JP | 2002012753 A | * | 1/2002 |
| JP | 2002-223080 | | 8/2002 |
| JP | 2003-133754 | | 5/2003 |
| JP | 2004-146284 | | 5/2004 |
| JP | 2004-330509 | | 11/2004 |
| JP | 2006-093345 | | 4/2006 |
| JP | 2006-129117 | | 5/2006 |
| JP | 2006-159681 | | 6/2006 |

OTHER PUBLICATIONS

Partial translation of corresponding Japanese office action dated Nov. 2, 2011.*

* cited by examiner

US 8,119,048 B2

HOUSING CASE, METHOD FOR MANUFACTURING HOUSING CASE, AND GLASS INSERT MOLDING DIE USED IN SAME

TECHNICAL FIELD

The present invention relates to a housing case for a small electric device and communication device, the front portion of the housing case; in particular, the portion of the housing case that covers an LCD or any other display screen having been adequately hardened, and also relates to a method for manufacturing the housing case and a glass insert molding die used in the same.

BACKGROUND ART

Small electric devices and communication devices, such as a digital audio player and a mobile phone, which can be placed in clothing or in a bag and carried, are often subject to impact on their surfaces when they are accidentally dropped or hit with other articles in the bag.

To address the problem, the housing case of such a device needs to have a highly robust hard coat layer coated on the front portion of the housing case; in particular, the portion that covers an LCD or any other display screen, in order to enhance scratch resistance. For example, Patent Document 1 discloses a housing case 100 (see FIG. 38) manufactured from a continuous film having a peelable layer, a hard coat layer 103, a printed layer, and an adhesive layer successively stacked on a base film. The hard coat layer 103 comprises layered hard coats for hardening the front portion of the housing case 100, and the printed layer includes a plurality of printed patterns, each of which having a non-printed portion 102. The housing case 100 is manufactured by continuously passing the continuous film through a glass insert molding die, injecting a transparent synthetic resin onto the adhesive layer of the continuous film in the glass insert molding die, and drawing the continuous film into the shape of the cavity of the glass insert molding die so as to form a synthetic resin layer 101. After the synthetic resin layer has hardened, the hard coat layer 103, the printed layer, the adhesive layer, and the synthetic resin layer 101 are removed from the base film and the peelable layer. In FIG. 38, reference numeral 104 denotes a display window that covers an LCD display screen, and reference numeral 105 denotes a button hole.

The hard coat layer 103 is typically manufactured by forming a thin coated film, ranging from approximately 3 to 10 μm in thickness, made of a thermoset resin, a UV curable resin, or any other suitable active energy radiation polymerizable resin on a plastic substrate directly or with an interposed primer layer having a thickness ranging from 0.03 to 0.5 μm.

The hard coat layer 103 comprising a thin coated film, however, is not hard enough as the front portion of the housing case; in particular, the portion that covers an LCD or any other display screen where high hardness is required.

The invention has therefore been contrived in view of the above problem. An object of the invention is to provide a housing case, the front portion of the housing case; in particular, the portion of the housing case that covers an LCD or any other display screen, being adequately hardened. Other objects of the invention are to provide a method for manufacturing the housing case and a glass insert molding die used in the same.

[Patent Document 1] Japanese Laid-open Patent Application No. 2001-36258

DISCLOSURE OF THE INVENTION

To achieve the above objects, a housing case according to the invention is characterized in that the housing case is used for a small electric device or communication device, and comprises a flat plate having a dimension substantially the same as that of a front portion of the housing case and comprising at least a glass plate; and a resin frame integrated with the flat plate to support a backside periphery of the flat plate.

In the housing case, the flat plate preferably has decoration on a rear surface of the glass plate.

In the housing case, the device preferably includes a display device, and the flat plate preferably has decoration on the front surface and/or the rear surface of the glass plate except at least a display window for the display device.

In the housing case, the rear surface of the glass plate is preferably not decorated, and the rear surface of the glass plate is preferably integrated with the resin frame with an adhesive layer for glass, a primer layer, and an adhesive layer for resin interposed between the rear surface of the glass plate and the resin frame.

In the housing case, the rear surface of the glass plate is preferably decorated, and the layer having the decoration also preferably serves as an adhesive layer for glass in the portion where the rear surface of the flat plate is integrated with the resin frame. The rear surface of the flat plate is preferably integrated with the resin frame with a primer layer and an adhesive layer for resin interposed between the rear surface of the flat plate and the resin frame.

In the housing case, the flat plate preferably has an opening.

The housing case preferably further comprises an opening resin frame integrated with the flat plate to support the surrounding portion of the opening.

In the housing case, the resin frame preferably covers a side surface of the flat plate.

In the housing case, the integrated flat plate and resin frame preferably has a box shape.

In the housing case, the resin frame preferably supports an entire backside periphery of the flat plate.

In the housing case, the resin frame preferably supports one, two, or three sides of the backside periphery of the flat plate.

In the housing case, a plurality of divided portions of the resin frame preferably support the backside periphery of the flat plate.

In the housing case, the resin frame is preferably made of a resin material having a molding shrinkage rate of 0.6% or lower.

To achieve the above objects, a glass insert molding die used to form a housing case according to the invention is characterized in that the glass insert molding die comprises a stationary die and a movable die that sandwich a flat plate primarily comprised of a glass plate when the dies are closed and form a cavity that faces periphery of the flat plate facing the stationary die and also an end surface of the flat plate. The glass insert molding die is also characterized in that the stationary die includes a sliding core having a bottom portion that comes into contact with the periphery of the flat plate facing the stationary die and a wall portion that is connected to the bottom portion and positionably comes into contact with the end surface of the flat plate, the bottom portion and the wall portion provided at the front end of the sliding core; and a suction hole provided in the surface where the flat plate is sandwiched. The glass insert molding die is also characterized in that the sliding core can be advanced and retracted in the die-closing direction between a flat plate positioning position and a cavity forming position, the flat plate positioning position being the position where the front-end bottom portion does not protrude from the surface of the stationary die where the flat plate is sandwiched but the front-end wall portion comes into contact with the flat plate, and the cavity forming position being the position where the front-end bottom portion and the front-end wall portion are separated from the flat plate.

In the glass insert molding die, it is preferable that the sliding core is partially provided along the entire perimeter of the flat plate.

In the glass insert molding die, it is preferable that the sliding core is further capable of being advanced to a glass insert mold pushing position where the front-end bottom portion protrudes from the surface of the stationary die where the flat plate is sandwiched.

To achieve the above objects, a method for manufacturing a housing case using the glass insert molding die according to the invention is characterized in that the method comprises the steps of: using the glass insert molding die, moving the sliding core to the flat plate positioning position and then placing the flat plate on the surface of the stationary die where the flat plate is sandwiched; suctioning and securing the positioned flat plate on the surface where the flat plate is sandwiched; closing the stationary die to which the flat plate has adhered and the movable die; and after the dies are closed, moving the sliding core to the cavity forming position and then injecting a molten resin into the cavity to integrate a resin frame with the flat plate.

To achieve the above objects, a method for manufacturing a housing case using the glass insert molding die according to the invention is characterized in that the method comprises the steps of: using the glass insert molding die including the pushing mechanism, moving the sliding core to the flat plate positioning position, and then placing the flat plate on the surface of the stationary die where the flat plate is sandwiched; suctioning and securing the positioned flat plate on the surface where the flat plate is sandwiched; closing the stationary die to which the flat plate has adhered and the movable die; after the dies are closed, moving the sliding core to the cavity forming position and then injecting a molten resin into the cavity to integrate a resin frame with the flat plate; and opening the dies and then moving the sliding core to the glass insert mold pushing position.

In the method for manufacturing a housing case, the flat plate preferably has decoration on the glass plate.

In the method for manufacturing a housing case, the flat plate preferably has an adhesive layer for glass, a primer layer, and an adhesive layer for resin sequentially formed on the glass plate.

In the method for manufacturing a housing case, the portion where the flat plate is sandwiched between the stationary die and the movable die preferably has an opening.

In the method for manufacturing a housing case, the material of the molten resin preferably has a molding shrinkage rate of 0.6% or lower.

The configuration of the invention described above provides the following advantages:

Since the housing case of the invention includes a flat plate comprising a glass plate and a resin frame integrated with the flat plate to support the backside periphery of the flat plate, the front portion of the housing case; in particular, the portion that covers an LCD or any other display screen, can be adequately hardened.

Since the glass insert molding die and the method for manufacturing a housing case of the invention can provide a housing case in which a resin frame is integrated with a flat plate primarily comprising a glass plate to support the backside periphery thereof, the front portion of the housing case; in particular, the portion that covers an LCD or any other display screen, can be adequately hardened. Further, since the sliding core provided in the glass insert molding die not only forms a cavity for molding the resin frame for supporting the backside periphery but also serves as a mechanism for positioning the flat plate as well as a mechanism for pushing the glass insert mold as required, the housing case can be manufactured at a low cost.

BEST MODE FOR CARRYING OUT THE INVENTION

1. Housing Case

Embodiments of the invention will be described below in detail with reference to the drawings.

Figure 1:
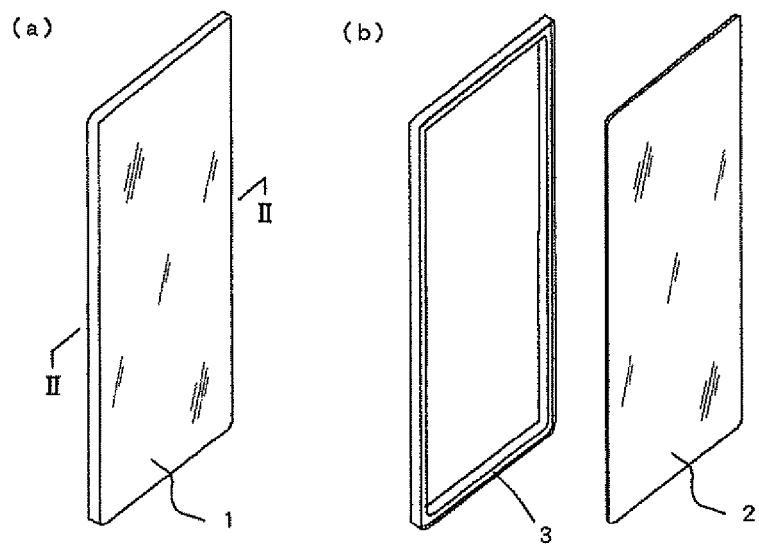
FIG. 1 is a perspective view showing an embodiment of a housing case according to the invention.

A housing case 1 shown in FIG. 1 includes a flat plate 2 having a dimension substantially the same as that of the front portion of the housing case and comprising at least a glass plate, and a resin frame 3 integrated with the flat plate 2 to support the backside periphery of the flat plate. The portion (b) in FIG. 1 is an exploded view of the portion (a). The housing case 1 is integrated with a back case (not shown), and the resultant integrated case houses a substrate on which a variety of electronic components are mounted to form a small electric device or communication device.

The flat plate 2 comprises at least a glass plate, which can provide sufficient hardness (at least 9H) of the front portion of the housing case 1. The glass plate can be any of a standard plate glass, a reinforced plate glass, a polished plate glass, and other suitable plate glass. The thickness of the glass plate, in consideration of the strength, preferably ranges from 0.3 mm to 2.0 mm, more preferably from 0.5 mm to 2.0 mm, still more preferably from 0.8 mm to 1.5 mm.

Figure 39:
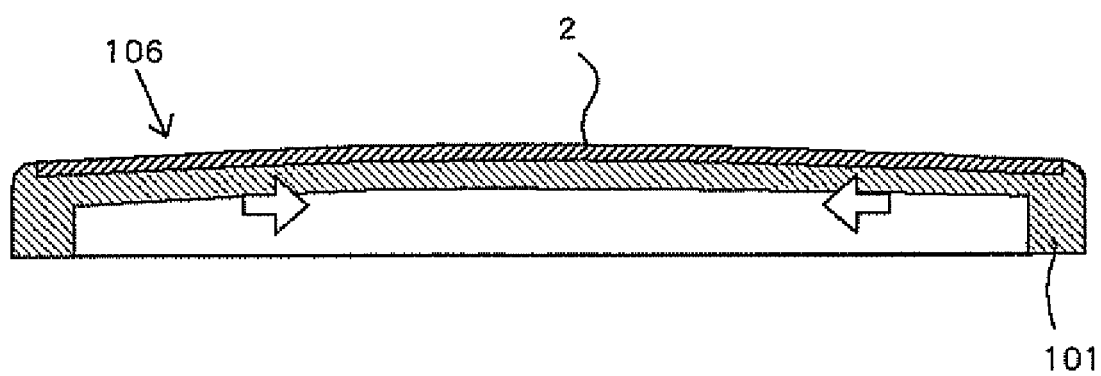
FIG. 39 is a cross-sectional view showing how molding shrinkage occurs when a glass plate, instead of a film comprising a hard coat layer, is inserted into a die and the glass plate is integrated with the whole front portion of a housing case.

To solve the problem described above, the inventor first planned, in the housing case of the related art, to integrate the synthetic resin layer with the flat plate 2 instead of the hard coat 103 in the front portion of the case. Specifically, the whole flat plate 2 is in contact with the synthetic resin layer 101 in the front portion of the case. The synthetic resin layer 101 that has been formed in the injection molding die, however, experiences molding shrinkage during cooling solidification, whereas the portion in contact with the whole flat plate 2 does not experience molding shrinkage, as shown in FIG. 39. Since only one side thus experiences the molding shrinkage (in the direction indicated by the arrows in FIG. 39, for example), the resultant housing case 106 is warped in some cases. In this case, the flat plate 2 breaks when it cannot withstand the warping.

Accordingly, in the invention, the resin frame 3 is employed so that only the periphery of the backside of the flat plate 2 is integrated. For example, in FIG. 1, the resin frame 3 supports the entire backside periphery of the flat plate 2. Since the resin frame 3 of the invention is not in contact with the whole flat plate 2, molding shrinkage of the resin frame 3, if any during the cooling solidification, will likely not affect the whole flat plate 2. The resultant housing case will therefore not be warped.

The resin frame 3 may be made of a polystyrene resin, a polyolefin resin, an ABS resin, an AS resin, an AN resin, or any other suitable general-purpose resin. Other useable materials may be a polyphenylene oxide/polystyrene resin, a polycarbonate resin, a polyacetal resin, a polyacrylic resin, a polycarbonate/denatured polyphenylene ether resin, a polybutylene terephthalate resin, an ultrahigh-molecular-weight polyethylene resin, and any other general-purpose engineering resin; and a polysulfone resin, a polyphenylene sulfide resin, a polyphenylene oxide resin, a polyallylate resin, a polyether-imide resin, a polyimide resin, a liquid crystal polyester resin, a polyallyl heat-resistant resin, and any other suitable super-engineering resin. In particular, a resin material having a molding shrinkage rate of 0.6% or lower is more preferably used for the resin frame 3 from the viewpoint of warping prevention, and an example of such a resin material is a polyacrylic resin. The resin frame 3 may or may not be colored.

The flat plate 2 is integrated with the resin frame 3 in the following manner. First, the flat plate 2 is introduced into a molding die comprising a movable die and a stationary die, and secured in a predetermined position on the cavity surface, for example, through vacuum suction. After the molding die is closed, a molten resin is injected through a gate into the cavity to fill it. The resin frame 3 is formed and at the same time bonded to the flat plate 2. After the resin frame 3 is cooled, the molding die is opened and the integrated flat plate 2 and resin frame 3 is removed. When a vertical molding die, which opens vertically, is used, the flat plate 2 can be secured without using vacuum suction or other methods.

Figure 2:
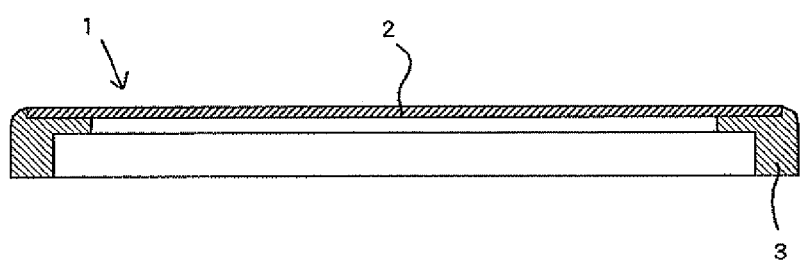
FIG. 2 is a cross-sectional view of the housing case taken along the line II-II shown in FIG. 1.
Figure 3:
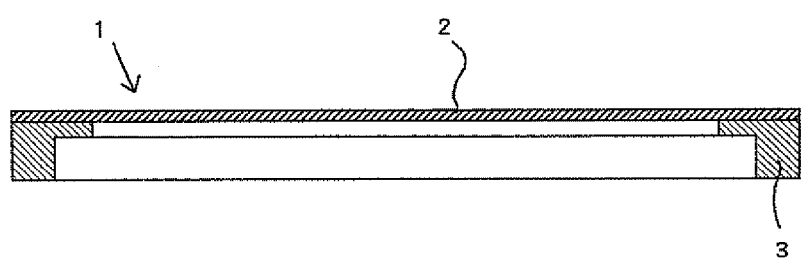
FIG. 3 is a cross-sectional view showing another embodiment of the housing case according to the invention.
Figure 4:
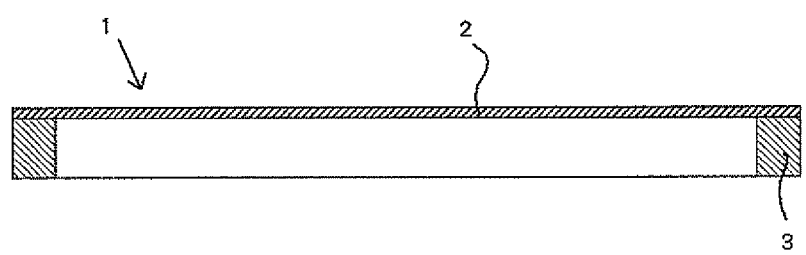
FIG. 4 is a cross-sectional view showing another embodiment of the housing case according to the invention.
Figure 5:
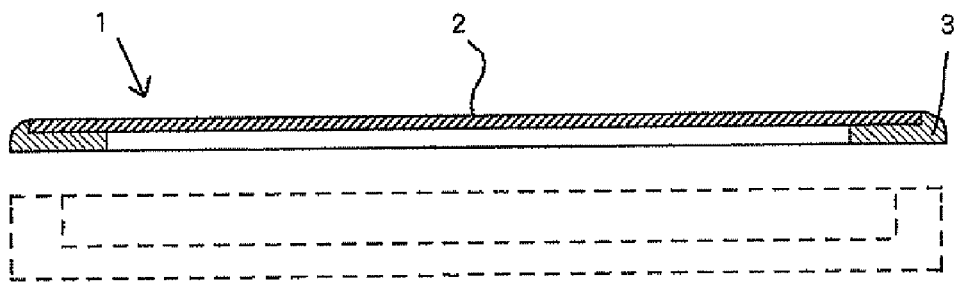
FIG. 5 is a cross-sectional view showing another embodiment of the housing case according to the invention.
Figure 6:
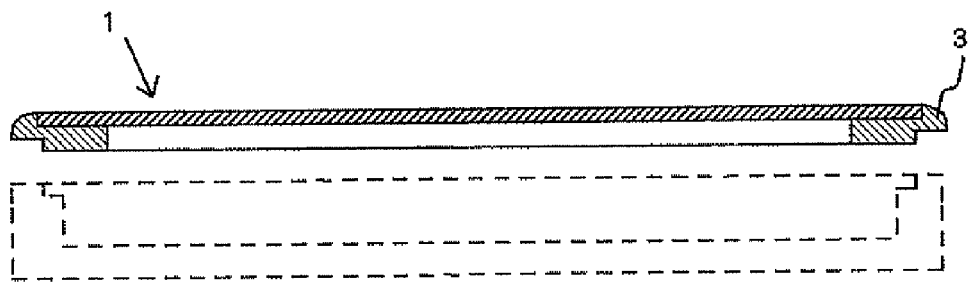
FIG. 6 is a cross-sectional view showing another embodiment of the housing case according to the invention.
Figure 7:
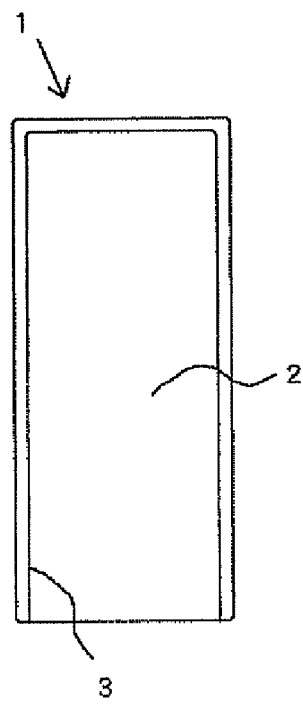
FIG. 7 is a rear view showing an embodiment of the housing case according to the invention.
Figure 8:
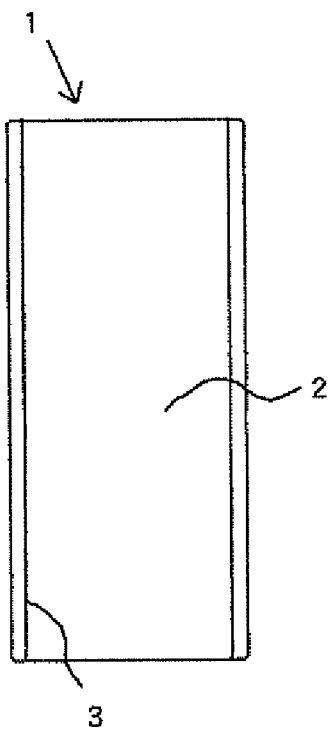
FIG. 8 is a rear view showing another embodiment of the housing case according to the invention.
Figure 9:
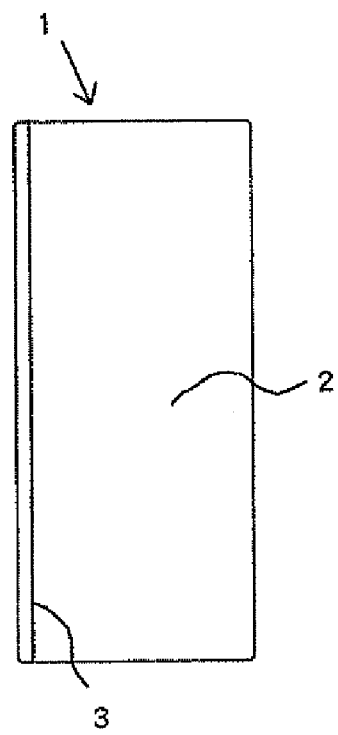
FIG. 9 is a rear view showing another embodiment of the housing case according to the invention.
Figure 10:
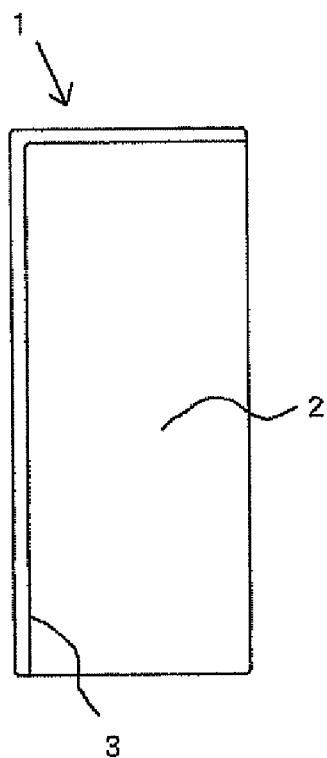
FIG. 10 is a rear view showing another embodiment of the housing case according to the invention.

The integrated flat plate 2 and resin frame 3 may have a box shape (see FIGS. 2 to 4) or a lid shape (see FIGS. 5 and 6: The broken line represents a counterpart back case). FIG. 2 is a cross-sectional view taken along the line II-II shown in FIG. 1, and FIGS. 3 to 6 show other embodiments of that shown in FIG. 2. In either case, the box shape or the lid shape, setting the dimension of the flat plate 2 to be slightly smaller than that of the front portion of the housing case 1 as shown in FIGS. 2, 5, and 6 provides more degrees of freedom in designing the exterior appearance of the housing case 1 than a case where the dimension of the flat plate 2 is the same as that of the front portion of the housing case 1 as shown in FIGS. 3 and 4. For example, it is possible to design the housing case 1 in such a way that the corners thereof are rounded (see FIGS. 2, 5, and 6). When a box shape is employed, setting the width of the portion where the flat plate 2 is integrated with resin frame 3 to be greater than the thickness of the sidewall of the box as shown in FIGS. 2 and 3 increases the area that supports the flat plate 2 accordingly, whereby the housing case 1 is more strengthened.

Roughening the backside periphery of the flat plate 2 allows the flat plate 2 to more intimately adhere to the resin frame 3.

Figure 11:
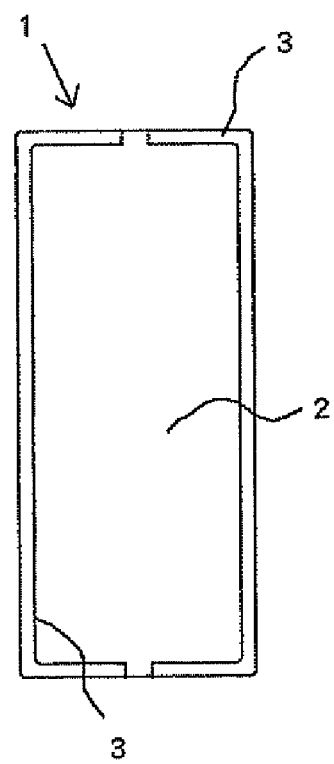
FIG. 11 is a rear view showing another embodiment of the housing case according to the invention.
Figure 12:
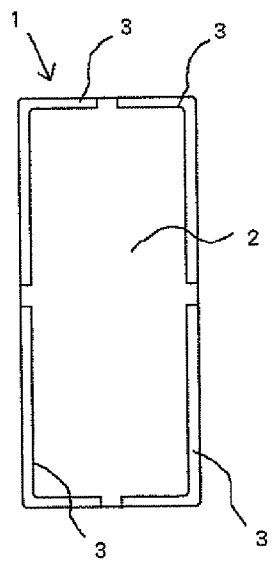
FIG. 12 is a rear view showing another embodiment of the housing case according to the invention.

The configuration of the housing case 1 of the invention is not limited to the aspect described above. For example, the resin frame 3 may support one, two, or three sides of the backside periphery (see FIGS. 7 to 10), or a plurality of divided portions of the resin frame 3 may support the backside periphery of the flat plate 2 (see FIGS. 11 and 12). In these cases, molding shrinkage of the resin frame 3, if any during the cooling solidification, will likely not affect the whole flat plate 2. Specifically, the housing case will less likely warp than the case where the resin frame 3 supports the entire backside periphery of the flat plate 2. Further, when the resin frame 3 does not support the entire backside periphery of the flat plate 2, input/output terminals and other components are readily provided on a side surface of the housing case 1.

The flat plate 2 may have decoration on the backside of the glass plate (not shown). Since the glass plate has a sufficient hardness (at least 9H), it is unlikely scratched, and the decoration on the backside viewed through the glass plate will not be degraded in terms of aesthetics.

The decoration on the backside of the glass plate is preferably formed by printing a decoration layer. Preferred examples of the material of the decoration layer include a polyvinyl chloride resin, a polyamide resin, a polyester resin, a polyacrylic resin, a polyurethane resin, a polyvinyl acetal resin, a polyester urethane resin, a cellulose ester resin, and an alkyd resin, any of which is used as a binder along with a coloring ink containing a pigment or a dye having an appropriate color as a coloring agent. A preferred example of the printing method is screen printing. For a solid single color, a variety of coating methods, such as spray coating, can be used.

The decoration layer may alternatively comprise a metal thin film layer or a combination of a printed layer and a metal thin film layer. The metal thin film layer serves to exhibit metallic luster as the decoration layer and is formed by using vacuum deposition, sputtering, ion plating, plating, or any other suitable method. In this case, aluminum, nickel, gold, platinum, chromium, iron, copper, tin, indium, silver, titanium, lead, zinc, or any other suitable metal, or any of the alloys or compounds thereof is used in accordance with the metallic luster color to be exhibited. To form a partial metal thin film layer, for example, after a solvent-soluble resin layer is formed on the portion where no metal thin film layer is required, a metal thin film is formed over the surface, and the solvent-soluble resin layer and the unnecessary metal thin film thereon are removed by solvent cleaning. The solvent used in this process is water or an aqueous solution in many cases. Alternatively, a metal thin film is formed over the surface, and a resist layer is formed on the portion where the metal thin film needs to be left. Acid or alkali is used to etch away the resist layer.

Figure 13:
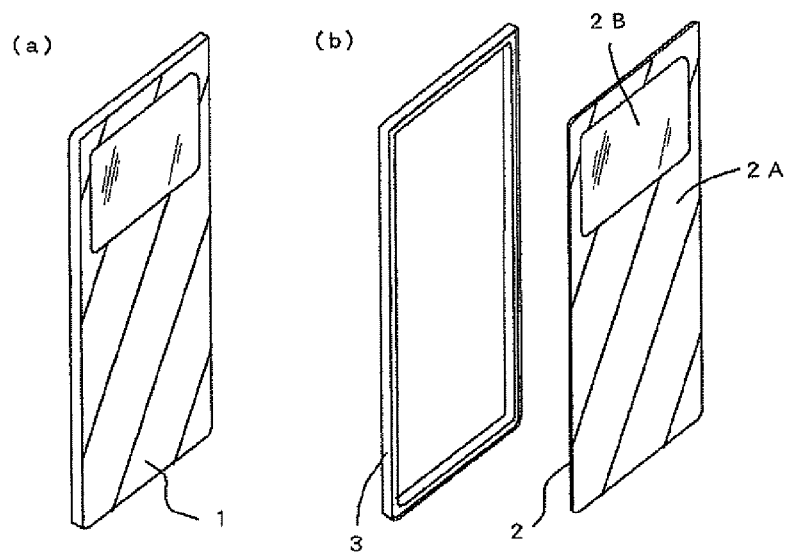
FIG. 13 is a perspective view showing another embodiment of the housing case according to the invention.

When the housing case 1 is used for a device including a display device, the flat plate 2 may have decoration on the front surface and/or the rear surface of the glass plate except at least a display window for the display device (see FIG. 13). In FIG. 13, the portion (b) is an exploded view of the portion (a), and reference characters 2A and 2B denote a decorated portion and an undecorated portion, respectively. When the front surface of the glass plate is decorated, the display screen of the display device viewed through the glass plate in the undecorated portion 2B will not be degraded in terms of clarity, because the glass plate has such a sufficient hardness (at least 9H) that it is unlikely to be scratched. When the rear surface of the glass plate is decorated, not only will the display screen not be degraded in terms of clarity as in the case where the front surface of the glass plate is decorated, because the glass plate has such a sufficient hardness (at least 9H) that it is unlikely to be scratched, but also the decoration on the rear surface viewed through the glass plate in the decorated portion 2A will not be degraded in terms of aesthetics.

Figure 14:
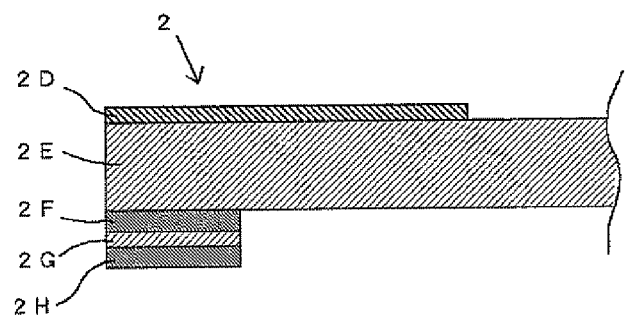
FIG. 14 is an enlarged cross-sectional view showing an embodiment of the structure of a flat plate of the housing case according to the invention.

The flat plate 2 of the housing case 1 of the invention may include a layer that allows the flat plate 2 to adhere more intimately to the resin frame 3. For example, an undecorated rear surface of a glass plate 2E may be integrated with the resin frame 3 with an adhesive layer for glass 2F, a primer layer 2G, and an adhesive layer for resin 2H interposed between the rear surface of the glass plate 2E and the resin frame 3 (see FIG. 14). FIG. 14 is an enlarged cross-sectional view of the flat plate 2, and reference character 2D in FIG. 14 denotes a front surface decoration layer.

The adhesive layer for glass 2F may be made of a known adhesive for glass, which can be, for example, an adhesive for glass made of a polyester resin.

The primer layer 2G may be made of a known primer material, which can be, for example, a primer material made of a polyester resin. When the adhesive layer for glass 2F strongly adheres to the adhesive layer for resin 2H, the primer layer 2G can be omitted.

The adhesive layer for resin 2H may be made of a known adhesive for resin, which can be, for example, an adhesive for resin made of a vinyl chloride/vinyl acetate/acrylic resin.

Figure 15:
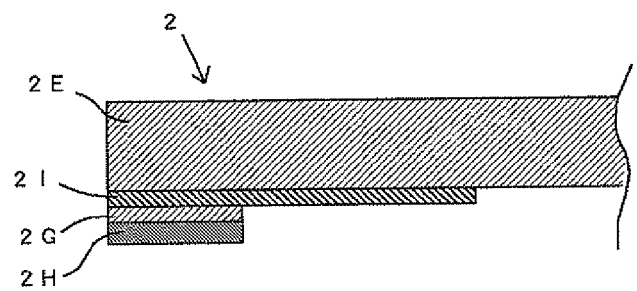
FIG. 15 is an enlarged cross-sectional view showing another embodiment of the structure of the flat plate of the housing case according to the invention.

The flat plate 2 of the housing case 1 of the invention may alternatively include the layer described below that allows the flat plate 2 to adhere more intimately to the resin frame 3. Specifically, the rear surface of the glass plate 2E is decorated, and the layer containing the decoration also serves as an adhesive layer for glass in the portion where the rear surface of the flat plate 2 is integrated with the resin frame 3. The rear surface of the flat plate 2 can be integrated with the resin frame 3 with the primer layer 2G and the adhesive layer for resin 2H interposed between the rear surface of the flat plate 2 and the resin frame 3 (see FIG. 15). FIG. 15 is an enlarged cross-sectional view of the flat plate 2. Reference character 2I in FIG. 15 denotes the backside decoration layer, which also serves as the adhesive layer for glass in the integrated portion. The decorative layer/adhesive layer for glass can be made of the same material as that of the adhesive layer for glass 2F described above but containing a pigment or a dye having an appropriate color as a coloring agent. In this case, the glass plate is unlikely to be scratched because it has a sufficient hardness (at least 9H), whereby the decoration on the rear surface viewed through the glass plate will not be degraded in terms of aesthetics.

The adhesive layer for glass 2F, the primer layer 2G, the adhesive layer for resin 2H, and the decorative layer/adhesive layer for glass may be formed, for example, by screen printing.

Figure 16:
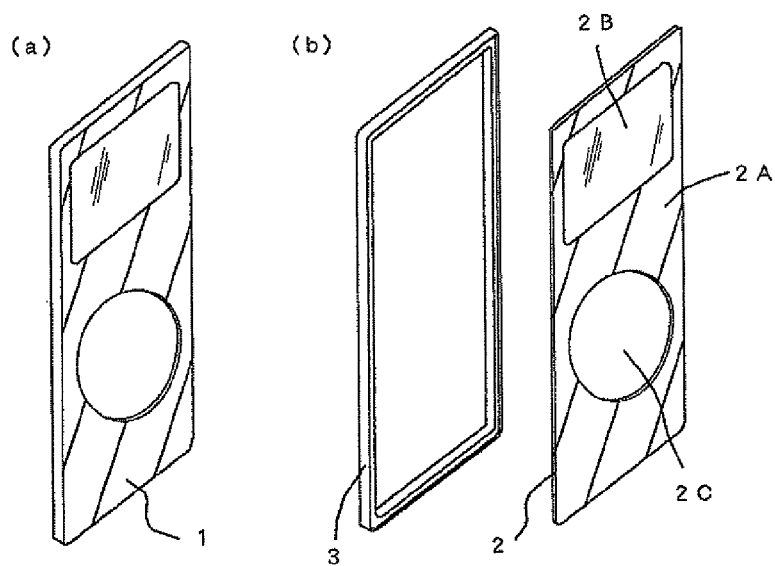
FIG. 16 is a perspective view showing another embodiment of the housing case according to the invention.

The flat plate 2 of the housing case 1 of the invention may have an opening 2C (see FIG. 16). The housing case 1 shown in FIG. 16 is integrated with a back case (not shown), and the resultant integrated case houses a substrate on which a flash memory or other electronic elements, a liquid crystal panel or other display devices, a piezoelectric speaker for outputting an operating sound, a battery, and an operation panel that fits in the opening 2C are mounted. A digital audio player is thus formed. The portion (b) in FIG. 16 is an exploded view of the portion (a).

Figure 17:
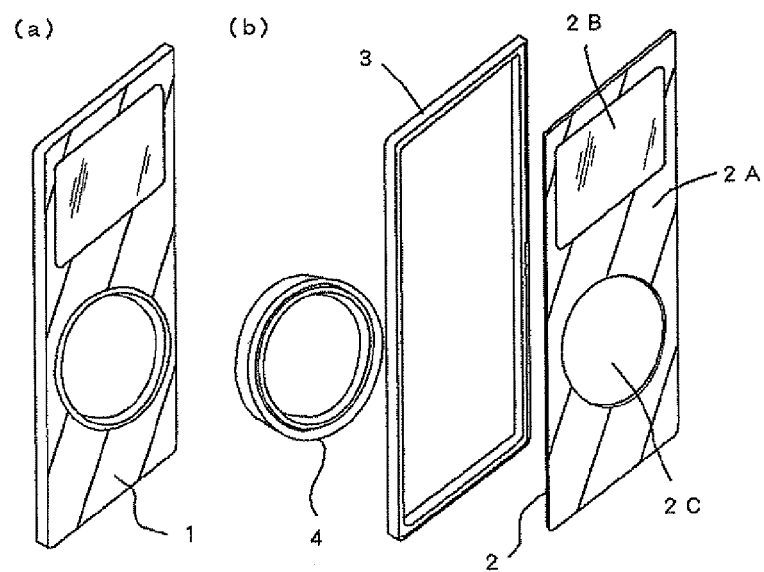
FIG. 17 is a perspective view showing another embodiment of the housing case according to the invention.

When the flat plate 2 of the housing case 1 of the invention has the opening 2C, it is further preferable to provide an opening resin frame 4 integrated with the flat plate 2 to support the surrounding portion of the opening 2C, as shown in FIG. 17. The thus configured housing case 1 is further strengthened. The opening resin frame 4 can be implemented in a variety of aspects as in the case of the resin frame 3. The portion (b) in FIG. 17 is an exploded view of the portion (a).

When the housing case 1 of the invention is configured in such a way that the resin frame 3 covers the side surfaces of the flat plate 2 not to create any step as shown in FIGS. 2, 5, and 6, there is no risk that the flat plate 2 is peeled off the resin frame 3 when any of the side surfaces of the flat plate 2 is caught by something when the product is in use.

2. Glass Insert Molding Die and Method for Manufacturing Housing Case

A glass insert molding die and a method for manufacturing the housing case will now be described. First, the housing case 1 provided in the present embodiment will be described with reference to FIGS. 26, 29, 30, 33, and 35. Any of the housing cases 1 shown in FIGS. 26, 29, 30, 33, and 35 includes the flat plate 2, which takes up almost all the front area of the housing case and comprises at least a glass plate, and the resin frame 3, which supports the backside periphery of the flat plate 2 and is integrated with the flat plate 2 in such a way that the resin frame 3 covers at least the portion of the end surfaces of the flat plate 2 that is connected to the supported portion. In FIGS. 26, 29, 30, 33, and 35, the portion (a) is a front view; the portion (b) is a rear view; and the portions (c) and (d) are cross-sectional views. The housing case 1 is integrated with a back case (not shown), and the resultant integrated case houses a substrate on which a variety of electronic components are mounted. A small electric device or communication device is thus formed.

In the invention, the resin frame 3, which is integrated with the periphery of the rear surface of the flat plate 2, is insert-molded. For example, in FIGS. 26, 33, and 35, the resin frame 3 supports all the backside periphery of the flat plate 2, whereas in FIGS. 29 and 30, the resin frame 3 supports a substantially C-shaped portion obtained by cutting part of the backside periphery of the flat plate 2. Since the resin frame 3 of the invention is not in contact with the whole flat plate 2, molding shrinkage of the resin frame 3, if any during the cooling solidification, will likely not affect the whole flat plate 2. The resultant housing case will therefore not suffer from warping.

Further, in the invention, since the resin frame 3 covers the end surfaces of the flat plate 2, there is no risk of the flat plate 2 peeling off the resin frame 3 when any of the end surfaces of the flat plate 2 is caught by something when the product is in use.

The flat plate 2 is integrated with the resin frame 3 by using a glass insert molding die, which will be described below.

The glass insert molding die includes a stationary die 15 and a movable die 10 that sandwich the flat plate 2 primarily comprising a glass plate when the dies are closed and form a cavity that faces not only the periphery of the flat plate 2 facing the stationary die 15 but also the end surfaces of the flat plate 2. The stationary die 15 includes a sliding core 5 having a bottom portion that comes into contact with the periphery of the flat plate 2 facing the stationary die 15 (hereinafter referred to as a front-end bottom portion 5b) and a wall portion that is connected to the front-end bottom portion 5b and positionally comes into contact with the end surfaces of the flat plate 2 (hereinafter referred to as a front-end wall portion 5a). The front-end wall portion 5a and the front-end bottom portion 5b are provided at the front end of the sliding core 5. The stationary die 15 further includes suction holes 8 provided in the surface where the flat plate 2 is sandwiched (hereinafter referred to as a flat plate abutting surface 7) (see FIGS. 18 and 19). FIG. 19 is a cross-sectional view taken along the line XIX-XIX shown in FIG. 18.

The sliding core 5 is capable of being advanced and retracted using a drive unit (not shown) in the direction in which the dies are closed between a flat plate positioning position I and a cavity forming position II. The flat plate positioning position I is the position where the front-end bottom portion 5b does not protrude from the surface of the stationary die 15 where the flat plate 2 is sandwiched but the front-end wall portion 5b comes into contact with the flat plate 2 (see FIGS. 19, 21 and 22). The cavity forming position II is the position where the front-end bottom portion 5b and the front-end wall portion 5a are separated from the flat plate 2 (see FIGS. 23 and 24). The sliding core 5 is capable of being advanced to a glass insert mold pushing position III where the front-end bottom portion 5b protrudes from the flat plate abutting surface 7 of the stationary die 15 as required (see FIG. 25).

Figure 21:
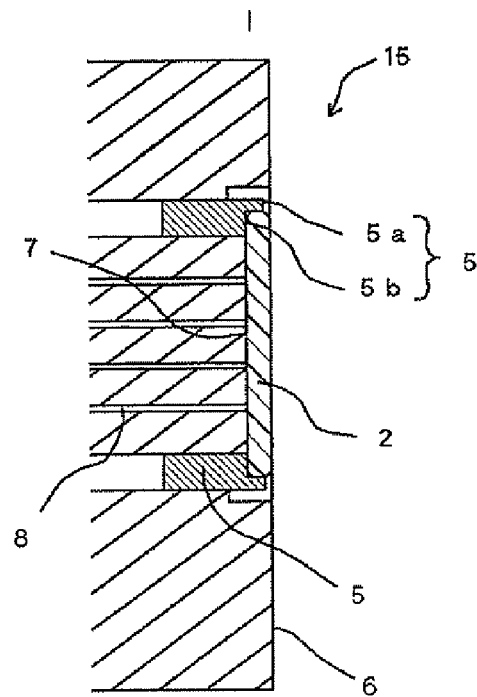
FIG. 21 is a cross-sectional view of the stationary die taken along the line XXI-XXI shown in FIG. 20.
Figure 22:
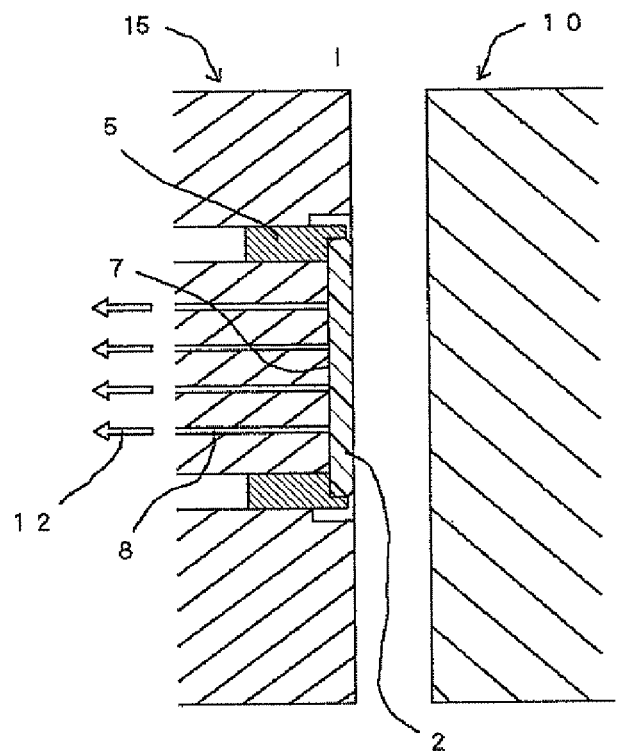
FIG. 22 is a cross-sectional view showing an embodiment of a step of manufacturing the housing case according to the invention.
Figure 34:
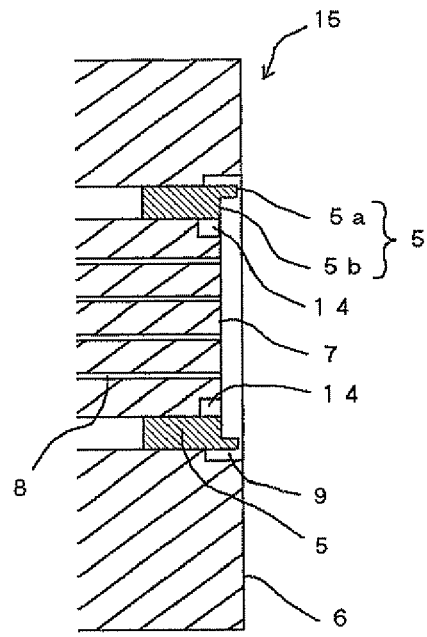
FIG. 34 is a cross-sectional view showing another embodiment of the stationary die of the glass insert molding die according to the invention.

In FIGS. 19, 21, and 22, the front-end bottom portion 5b of the sliding core 5 is seamlessly connected with the flat plate abutting surface 7 of the stationary die 15. A groove 14 may alternatively be formed between the front-end bottom portion 5b and the flat plate abutting surface 7 (see FIG. 34). In this case, the area of the resin frame 3 that is integrated with the backside periphery of the flat plate 2 increases by the amount of the resin that fills the groove 14 in the molding process. The flat plate positioning position I may be set in such a way that the front-end bottom portion 5b is flush with the flat plate abutting surface 7 of the stationary die 15 as shown in FIGS. 19, 21, and 22. The flat plate positioning position I may alternatively be set in such a way that the front-end bottom portion 5b is retracted from the flat plate abutting surface 7 of the stationary die 15, because the flat plate 2 can be positioned as long as the front-end wall portion 5a comes into contact with the end surfaces of the flat plate 2.

Figure 18:
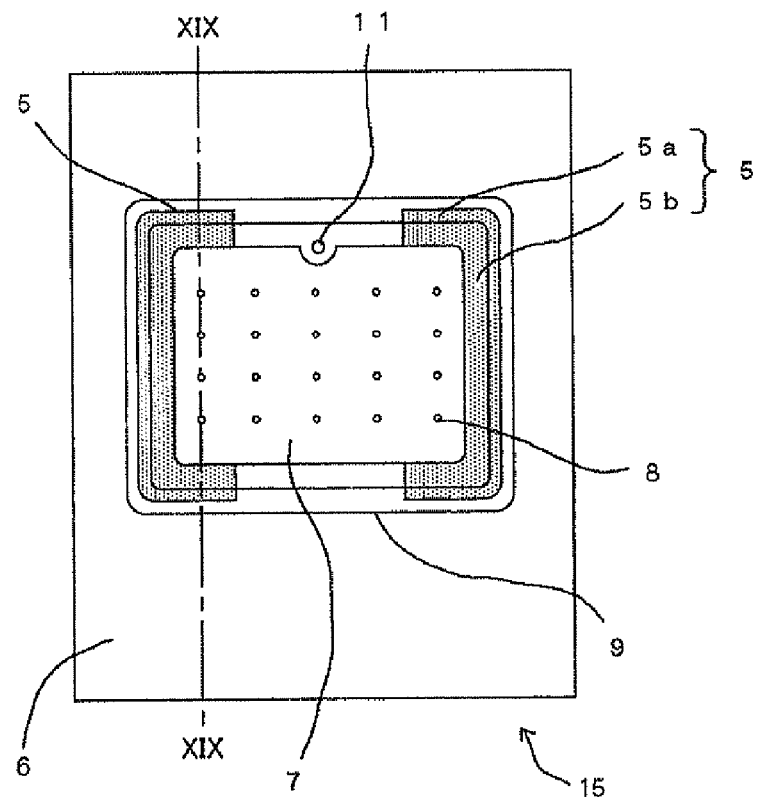
FIG. 18 shows an embodiment of a stationary die of a glass insert molding die according to the invention, the stationary die viewed from a movable die side.
Figure 19:
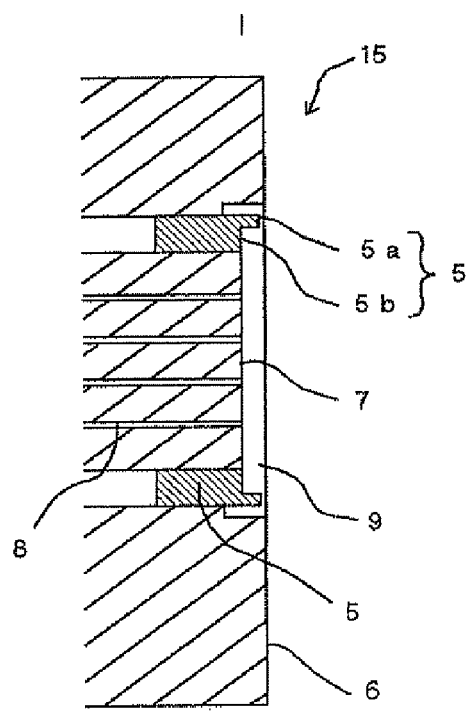
FIG. 19 is a cross-sectional view of the stationary die taken along the line XIX-XIX shown in FIG. 18.

The front-end wall portion 5a to positionally come into contact with the end surfaces of the flat plate 2 can be formed into two U-shaped portions facing each other when viewed in the direction perpendicular to a die parting plane 6, for example, as shown in FIG. 18. The arrangement of the front-end wall portion 5a is, of course, not limited to the aspect described above, but the arrangement may be determined as appropriate not to misalign the flat plate 2 in accordance with the shape of the flat plate 2. For example, the front-end wall portion 5a can be disposed at each corner of the flat plate 2 or at part of each side of the flat plate 2. The flat plate 2 can have an arbitrary shape, such as a rectangle with rounded corners as shown in FIG. 18, a rectangle with square corners, and an ellipse. Further, the number of sliding cores 5 is not limited to a specific number. Moreover, the sliding core 5 may be partially provided along the perimeter of the flat plate 2 as shown in FIG. 18, or the front-end wall portion 5a may completely surround the flat plate 2.

A method for manufacturing the housing case 1 using the thus configured glass insert molding die will now be described.

Figure 20:
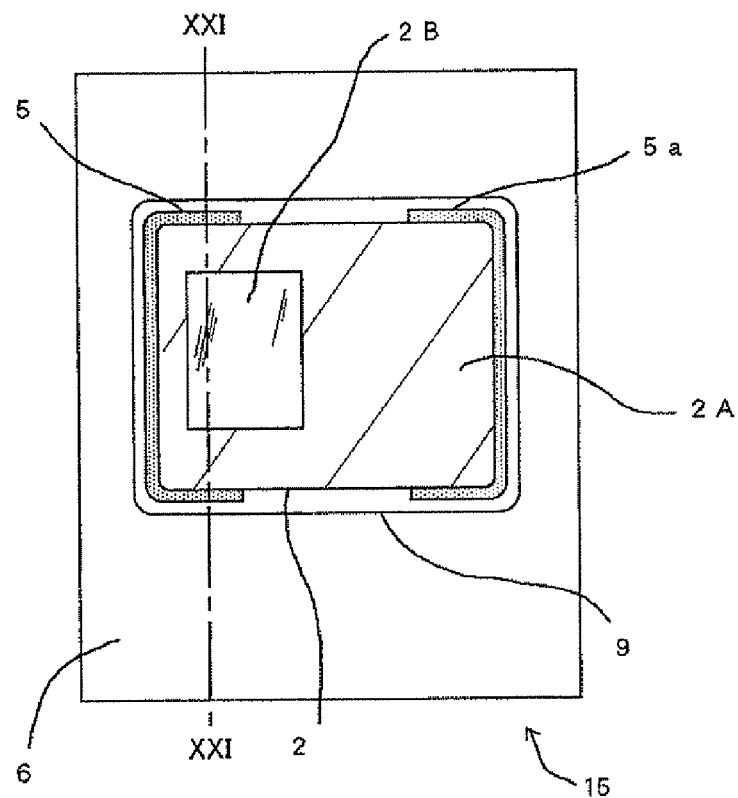
FIG. 20 shows the arrangement in which the flat plate is placed in the stationary die, the arrangement viewed from the movable die side.

First, after the sliding core 5 is moved to the flat plate positioning position I, the flat plate 2 is placed on the flat plate abutting surface 7 of the stationary die 15 (see FIGS. 20 and 21). FIG. 21 is a cross-sectional view taken along the line XXI-XXI shown in FIG. 20.

In this positioned state, the flat plate 2 is suctioned and secured on the flat plate abutting surface 7 as a result of air 12 being suctioned through the suction holes 8 provided in the flat plate abutting surface 7 (see FIG. 22). The process by which the flat plate is suctioned and secured is not necessarily limited to the suctioning of air. For example, suction cups may be provided on the surface where the flat plate 2 is sandwiched.

Figure 23:
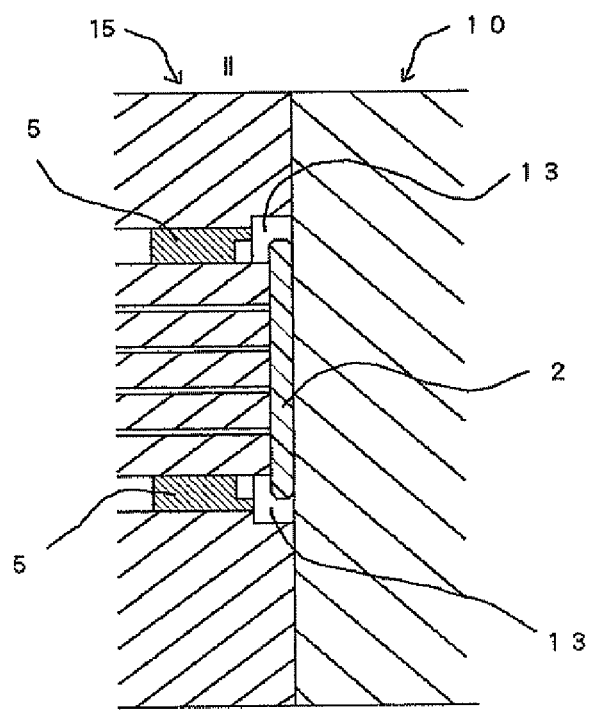
FIG. 23 is a cross-sectional view showing an embodiment of a step of manufacturing the housing case according to the invention.
Figure 24:
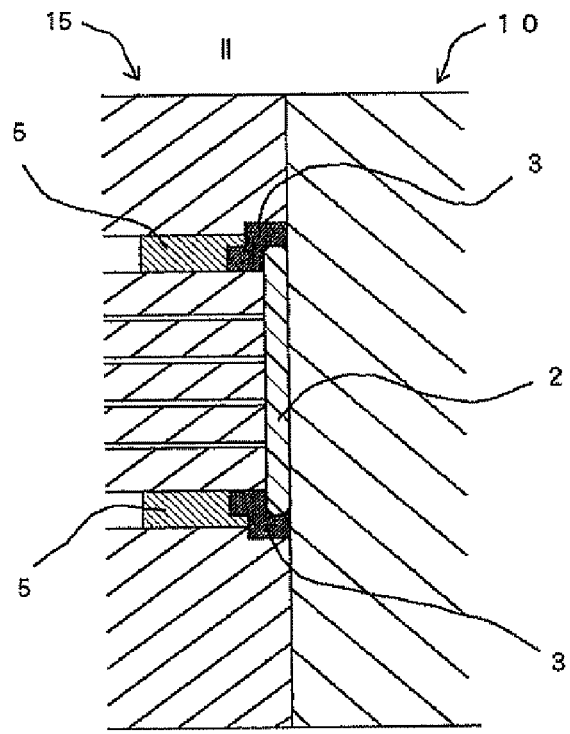
FIG. 24 is a cross-sectional view showing an embodiment of a step of manufacturing the housing case according to the invention.

The movable die 10 is then advanced toward the stationary die 15 to which the flat plate 2 has adhered so as to close the dies, whereby the movable die 10 and the flat plate abutting surface 7 of the stationary die 15 sandwich the flat plate 2, and the stationary die 15, the movable die 10, and the flat plate 2 form a cavity 13, which is a die space (see FIG. 23). At this point, the drive unit (not shown) retracts the sliding core 5 to the position where the front-end bottom portion 5b is separated by a predetermined distance from the backside periphery of the flat plate 2, and a molten resin can now reach the portion that was in contact with the front-end wall portion 5a and the front-end bottom portion 5b of the sliding core 5 (cavity forming position II). The retraction of the sliding core 5 may be carried out at any of the following points in time: immediately before the movable die 10 starts being advanced, during the forward movement, and immediately after the advancing movement is completed.

After the sliding core 5 is moved to the cavity forming position II and the cavity 13 is filled with the molten resin injected through a gate 11, the resin frame 3 is integrated with the flat plate 2 in such a way that the resin frame 3 supports the backside periphery of the flat plate 2 and covers the portion of the end surfaces of the flat plate 2 that is connected to the supported portion. The housing case 1, which is the glass insert mold, is thus obtained (see FIG. 24).

The molten resin may be a polystyrene resin, a polyolefin resin, an ABS resin, an AS resin, an AN resin, or any other suitable general-purpose resin. Other useable materials may be a polyphenylene oxide/polystyrene resin, a polycarbonate resin, a polyacetal resin, a polyacrylic resin, a polycarbonate/denatured polyphenylene ether resin, a polybutylene terephthalate resin, an ultrahigh-molecular-weight polyethylene resin, and any other general-purpose engineering resin; and a polysulfone resin, a polyphenylene sulfide resin, a polyphenylene oxide resin, a polyallylate resin, a polyether-imide resin, a polyimide resin, a liquid crystal polyester resin, a polyallyl heat-resistant resin, and any other suitable super-engineering resin. In particular, a resin material having a molding shrinkage rate of 0.6% or lower is more preferably used for the resin frame 3 in terms of preventing warping, and an example of such a resin material is a polyacrylic resin. The resin frame 3 may or may not be colored.

Figure 25:
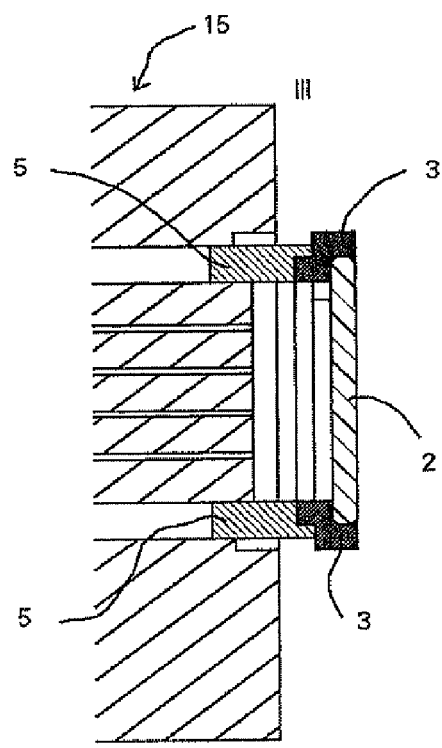
FIG. 25 is a cross-sectional view showing an embodiment of a step manufacturing of the housing case according to the invention.

After the movable die 10 is retracted to be separated from the stationary die 15, specifically, the dies are opened, the drive unit forwards the sliding core 5 to the glass insert mold pushing position III (see FIG. 25). In this process, the sliding core 5 serves as an ejector pin, and the housing case 1 is smoothly separated from the stationary die 15. The housing case 1 can thus be readily removed from the die device. When a dedicated ejector pin is separately prepared, the sliding core 5 is not necessarily used to push the glass insert mold.

As described above, in the method for manufacturing the housing case using the glass insert molding die according to the present embodiment, since the sliding core 5 not only forms the cavity for molding the resin frame 3 for supporting the backside periphery but also serves as the mechanism for positioning the flat plate 2 as well as the mechanism for pushing the glass insert mold as required, the housing case 1 can be manufactured at a low cost.

Figure 26:
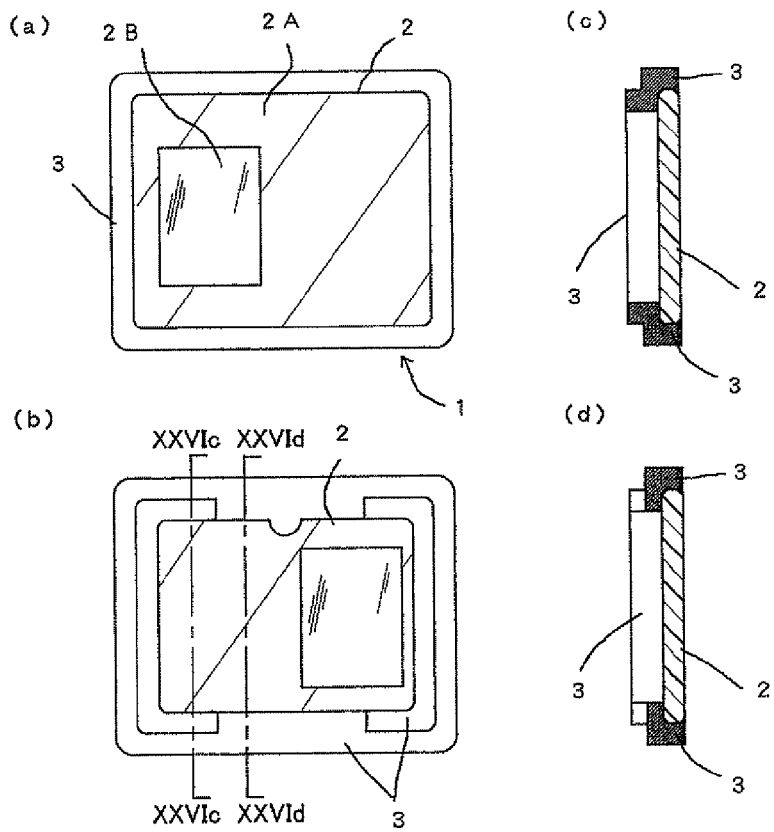
FIG. 26 shows an example of the housing case obtained by using the stationary die shown in FIG. 18.
Figure 29:
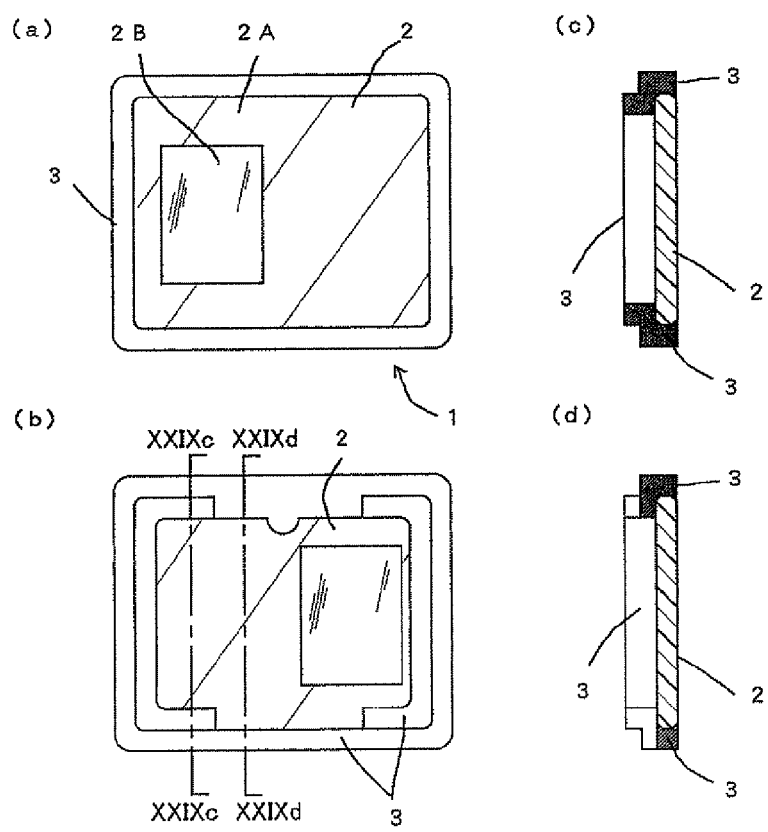
FIG. 29 shows an example of the housing case obtained by using the stationary die shown in FIG. 27.
Figure 30:
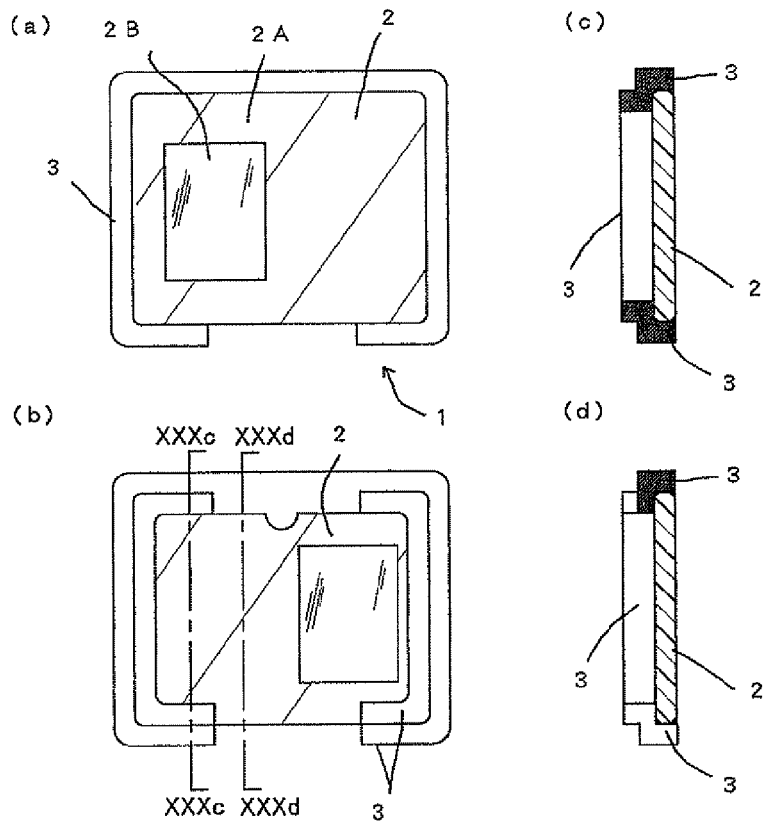
FIG. 30 shows an example of the housing case obtained by using the stationary die shown in FIG. 28.
Figure 31:
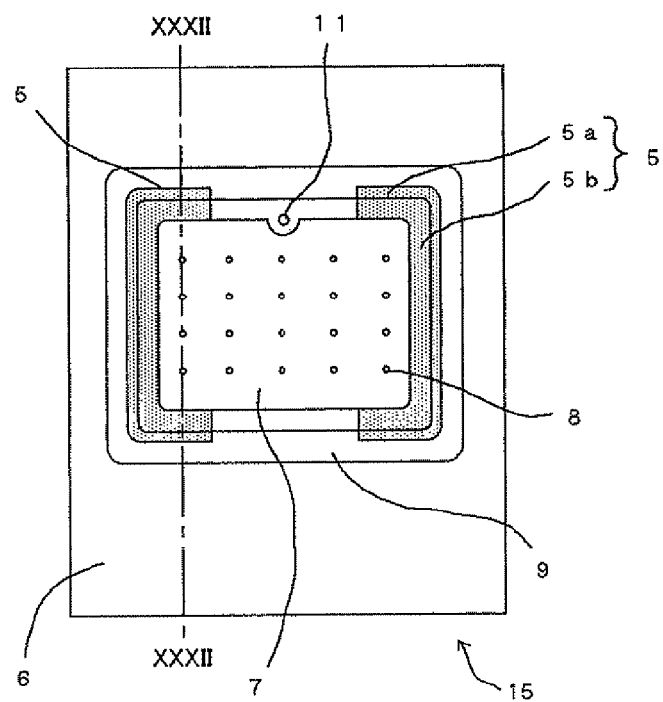
FIG. 31 shows another embodiment of the stationary die of the glass insert molding die according to the invention, the stationary die viewed from the movable die side.
Figure 32:
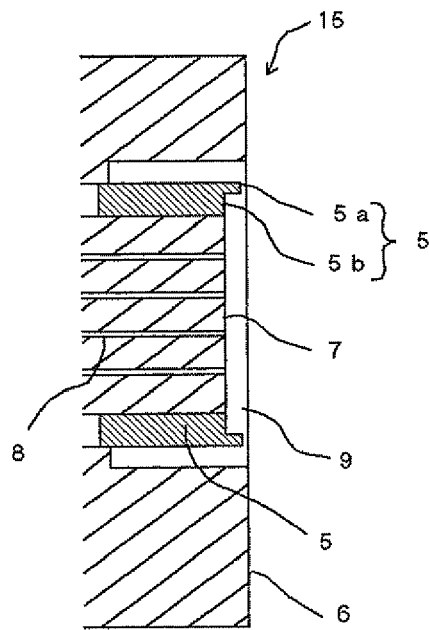
FIG. 32 is a cross-sectional view of the stationary die taken along the line XXXII-XXXII shown in FIG. 31.
Figure 33:
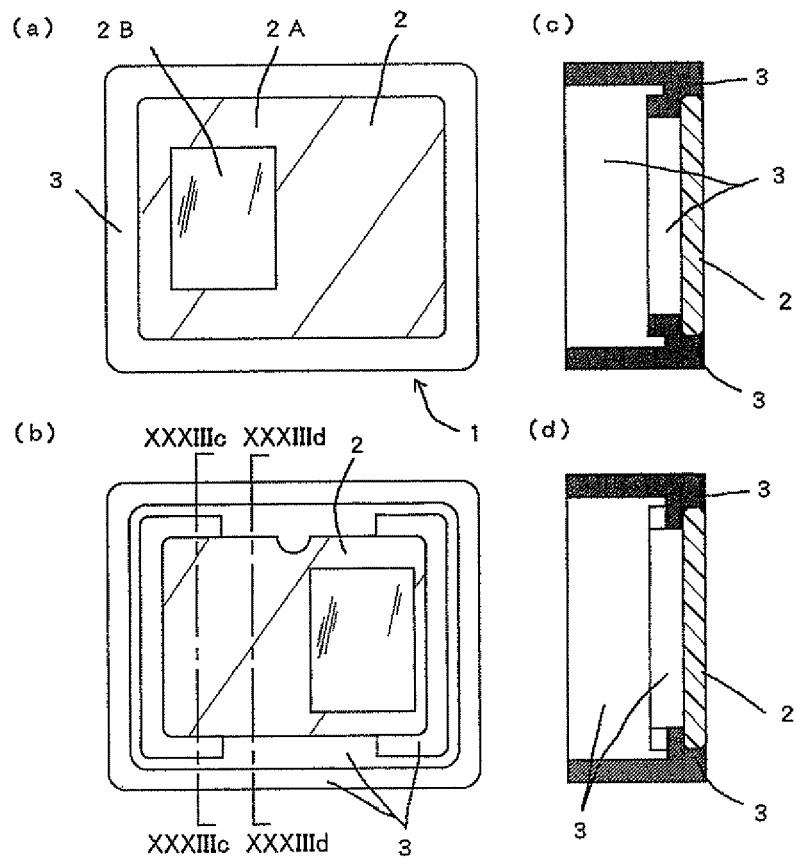
FIG. 33 shows an example of the housing case obtained by using the stationary die shown in FIG. 31.
Figure 35:
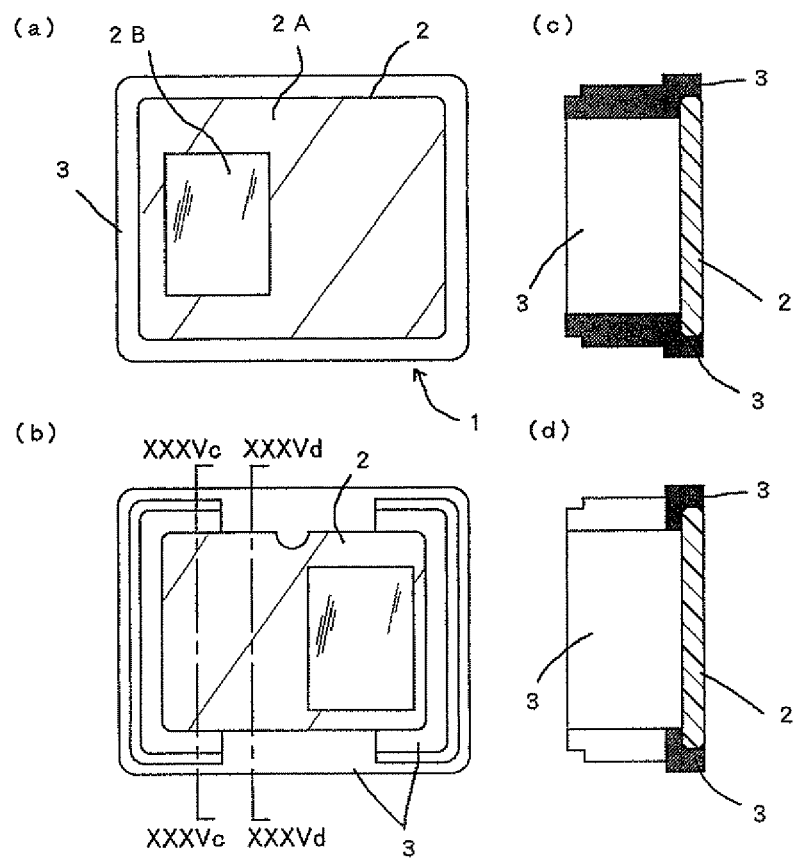
FIG. 35 shows another example of the housing case obtained by using the stationary die shown in FIG. 18.

The integrated flat plate 2 and resin frame 3 may have a lid shape (see FIGS. 26, 29, and 30) or a box shape (see FIGS. 33 and 35). FIGS. 26(c) and 26(d) are cross-sectional views taken along the lines XXVIc-XXVIc and XXVId-XXVId in FIG. 26(b), respectively. FIGS. 29(c) and 29(d) are cross-sectional views taken along the lines XXIXc-XXIXc and XXIXd-XXIXd in FIG. 29(b), respectively. FIGS. 30(c) and 30(d) are cross-sectional views taken along the lines XXXc-XXXc and XXXd-XXXd in FIG. 30(b), respectively. Even when the box shape is employed, it is conceivable that a box sidewall cavity is formed outside the sliding core 5 as shown in FIG. 33, or a sidewall cavity is formed by retracting the sliding core 5 as shown in FIG. 35. The same notation as that used in the above cases applies to FIGS. 33 and 35. FIGS. 33(c) and 33(d) are cross-sectional views taken along the lines XXXIIIc-XXXIIIc and XXXIIId-XXXIIId in FIG. 33(b), respectively. FIGS. 35(c) and 35(d) are cross-sectional views taken along the lines XXXVc-XXXVc and XXXVd-XXXVd in FIG. 35(b), respectively.

Figure 27:
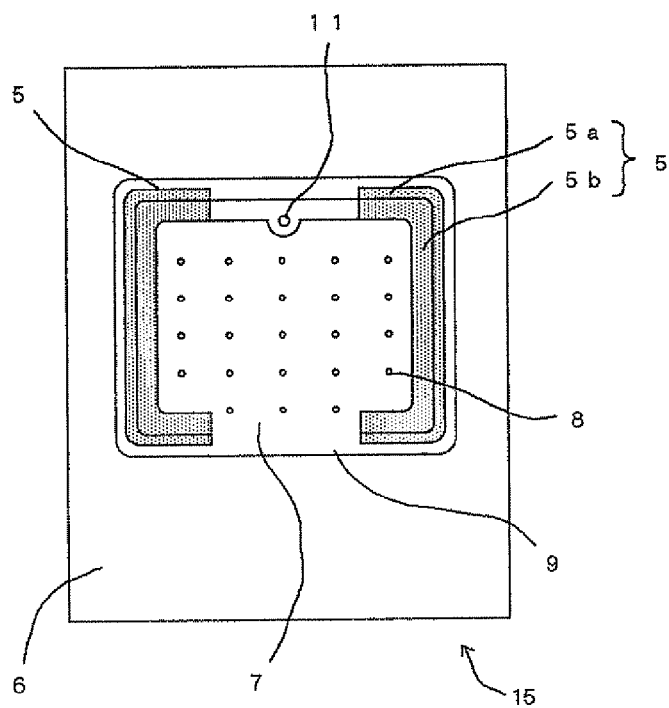
FIG. 27 shows another embodiment of the stationary die of the glass insert molding die according to the invention, the stationary die viewed from the movable die side.
Figure 28:
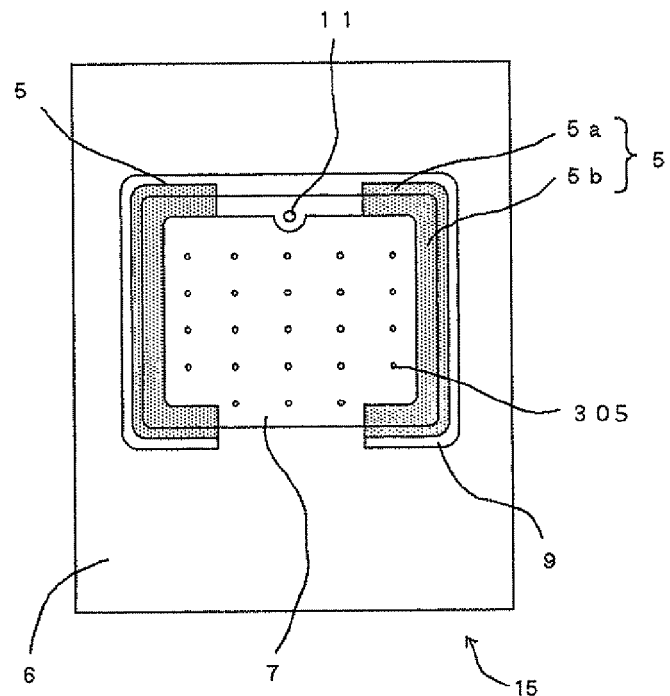
FIG. 28 shows another embodiment of the stationary die of the glass insert molding die according to the invention, the stationary die viewed from the movable die side.

Among the backside periphery and end surfaces of the flat plate 2, the portions that do not correspond to the sliding core 5 are not necessarily integrated with the resin frame 3 as shown in FIGS. 26, 33, and 35. For example, only the end surface that does not correspond to the sliding core 5 may be integrated with the resin frame 3 as shown in FIG. 29, or the backside periphery or end surface that does not correspond to the sliding core 5 may not integrated with the resin frame 3 as shown in FIG. 30. To obtain the housing case 1 shown in FIG. 29, the flat plate abutting surface 7 in FIG. 18 is extended to the lower inner wall of a cavity forming portion 9 as shown in FIG. 27 so that the corresponding portion of the backside periphery of the glass plate 2 is not filled with the molten resin. To obtain the housing case 1 shown in FIG. 30, the flat plate abutting surface 7 in FIG. 18 is not changed but the lower inner wall of the cavity forming portion 9 is shifted to the lower end of the flat plate abutting surface 7 as shown in FIG. 28 so that the corresponding portions of the backside periphery and the end surface of the glass plate 2 are not filled with the molten resin.

The flat plate 2 may be a decorated glass plate as shown in FIGS. 26, 29, 30, 33, and 35, or may be an undecorated, skeleton glass plate. In FIGS. 26, 29, 30, 33, and 35, reference character 2A denotes the decorated portion, and reference character 2B denotes the undecorated portion, which becomes a transparent window.

The decoration on the rear surface of the glass plate is formed by printing a decoration layer. Examples of the material of the decoration layer may include a polyvinyl chloride resin, a polyamide resin, a polyester resin, a polyacrylic resin, a polyurethane resin, a polyvinyl acetal resin, a polyester urethane resin, a cellulose ester resin, and an alkyd resin, any of which is used as a binder along with a coloring ink containing a pigment or a dye having an appropriate color as a coloring agent. An example of the printing method may be screen printing. For a solid single color, a variety of coating methods, such as spray coating, can be used.

The decoration layer may alternatively comprise a metal thin film layer or a combination of a printed layer and a metal thin film layer. The metal thin film layer serves to exhibit metallic luster as the decoration layer and is formed by using vacuum deposition, sputtering, ion plating, plating, or any other suitable method. In this case, aluminum, nickel, gold, platinum, chromium, iron, copper, tin, indium, silver, titanium, lead, zinc, or any other suitable metal, or any of the alloys or compounds thereof is used in accordance with the metallic luster color to be exhibited. To form a partial metal thin film layer, for example, after a solvent-soluble resin layer is formed on the portion where no metal thin film layer is required, a metal thin film is formed over the surface, and the solvent-soluble resin layer and the unnecessary metal thin film thereon are removed by solvent cleaning. The solvent used in this process is water or an aqueous solution in many cases. Alternatively, a metal thin film is formed over the surface, and a resist layer is formed on the portion where the metal thin film needs to be left. Acid or alkali is used to etch away the resist layer.

Roughening the surface of the flat plate 2 that is integrated with the resin frame 3 allows the flat plate 2 to more intimately adhere to the resin frame 3.

Figure 36:
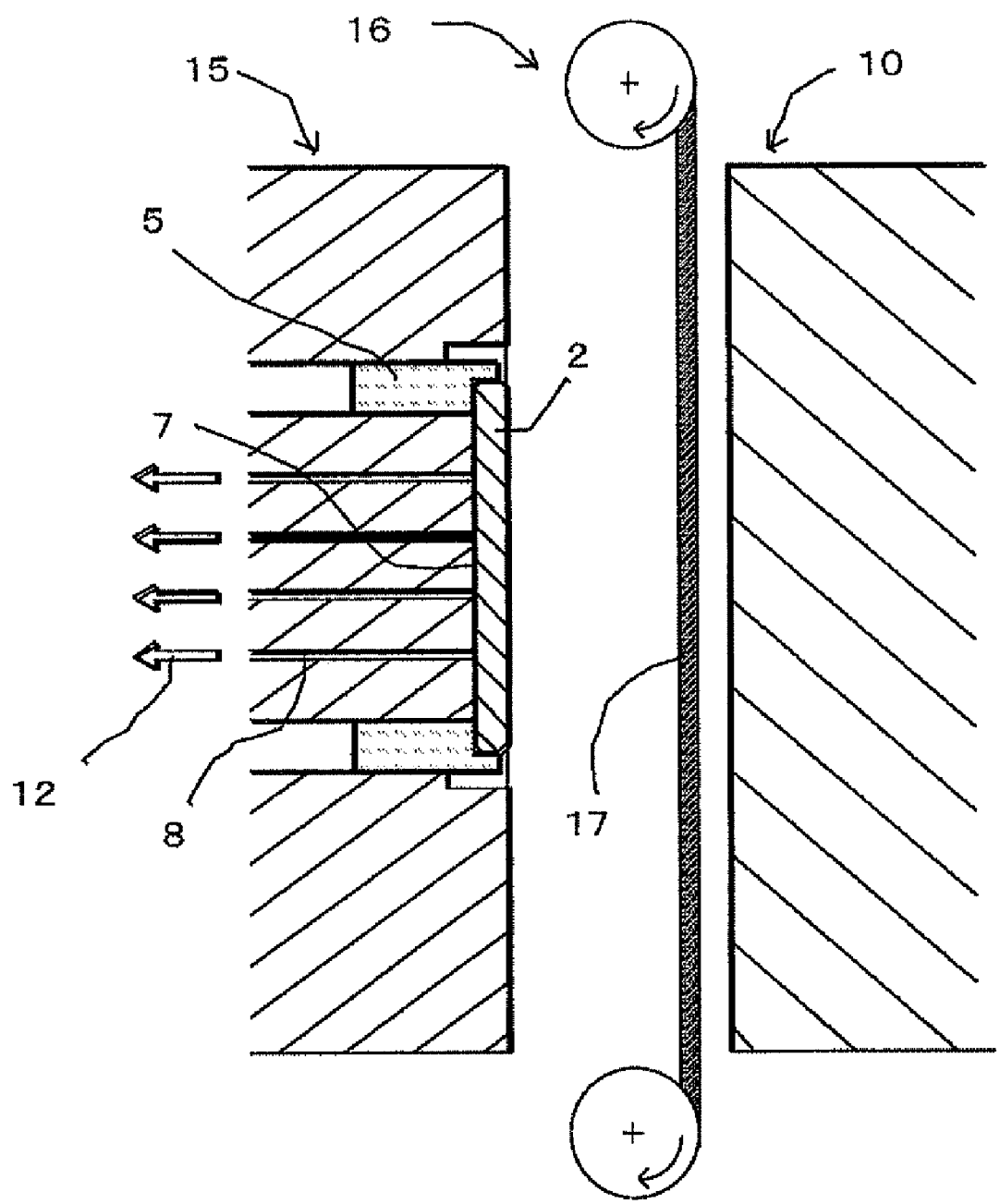
FIG. 36 shows an embodiment of the glass insert molding die according to the invention in which a transfer film is sandwiched between the stationary die to which the flat plate has adhered and the movable die.
Figure 37:
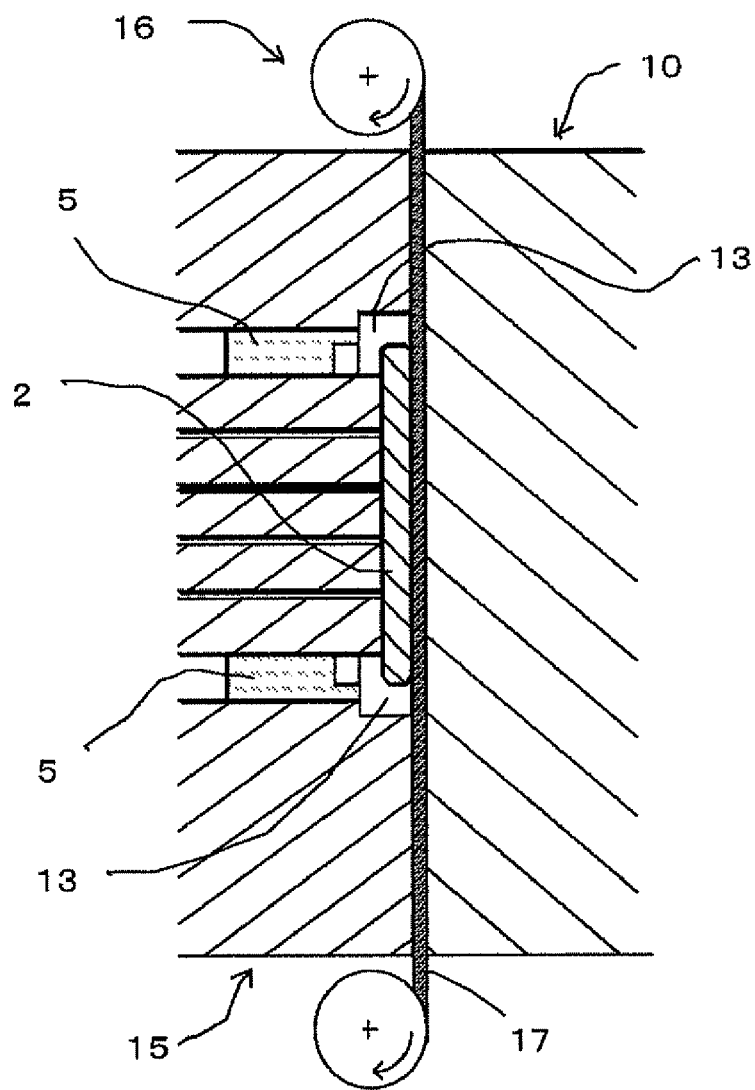
FIG. 37 shows an example of the closed glass insert molding die shown in FIG. 36 after the transfer film is sandwiched.
Figure 38:
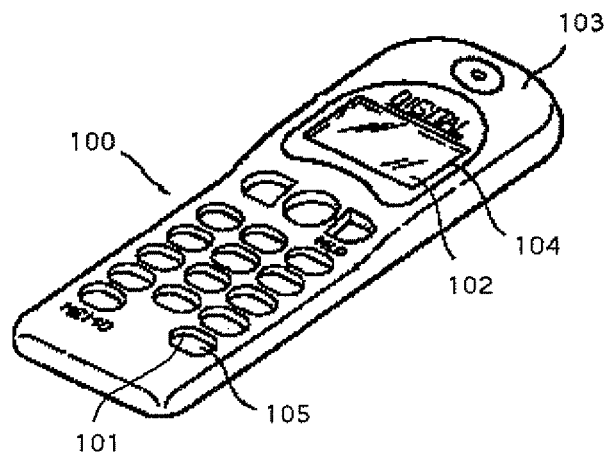
FIG. 38 is a perspective view showing a housing case of related art.

The glass insert molding die of the invention may include simultaneous molding/painting means 16 for allowing a transfer film 17 to be sandwiched between the stationary die 15 to which the flat plate 2 has adhered and the movable die 10 (see FIG. 36). After the transfer film 17 is sandwiched between the stationary die 15 to which the flat plate 2 has adhered and the movable die 10, and the dies are closed (see FIG. 37), the painting portion of the transfer film 17 can be transferred to the resin frame 3 integrated with the flat plate 2 simultaneously with the injection of the molten resin. Specifically, the glass insert molding die of the invention also serves as a simultaneous molding/transferring die.

The transfer film 17 includes a transfer layer on an elongated base sheet. The transfer layer has a peelable layer, a pattern layer, an adhesive layer, and other layers sequentially stacked. The peelable layer allows the transfer layer to be peeled off the base sheet. The pattern layer provides the surface of an injection-molded piece with decorative appearance and functionality. Examples of the pattern layer include a typical printed pattern and a conductive pattern made of a conductive material. The adhesive layer bonds the transfer layer to the resin frame 3, which is the molded piece.

The transfer film 17 may be adapted in such a way that a film feeding device shown in FIG. 36 feeds the painting portion of the transfer film 17 between the dies by a predetermined length at a time. Alternatively, a plurality of transfer film sheets may be fed sheet by sheet.

Any of the variety of embodiments can be combined as appropriate to provide the respective advantageous effects. While the invention has been adequately described with reference to the accompanying drawings in relation to preferred embodiments, a variety of variations and modifications shall be apparent to those skilled in the art. Such variations and modifications should be taken as encompassed within the scope of the invention to the extent that they do not depart from the scope of the invention set forth by the claims.

Examples, of the values in the above embodiments will be described below, but the scope of the invention is not limited thereto.

EXAMPLE 1

A glass plate of 88 mm in length, 38 mm in width, and 1 mm in thickness was prepared, and a circular opening for an operation panel was provided in the glass plate. A decorative layer was then formed on one side of the glass plate except a display window for a liquid crystal screen by using screen printing along with an ink containing a coloring agent and a polyester resin as a binder. An adhesive layer for glass made of a polyester resin, a primer layer made of a polyester resin, and an adhesive layer for resin made of a vinyl chloride/vinyl acetate/acrylic resin were then sequentially formed on the entire periphery of the undecorated side of the glass plate by using screen printing. A flat plate was thus obtained.

The flat plate was introduced into a molding die comprising a movable die and a stationary die, and secured in a predetermined position on the cavity surface through vacuum suction. After the molding die was closed, a molten polyacrylic resin was injected through the gate to fill the cavity. A rectangular resin frame was formed, and at the same time the resin frame was bonded to the undecorated surface of the flat plate with the adhesive layer for resin, the primer layer, and the adhesive layer for glass interposed between the resin frame and the undecorated surface of the flat plate. After the resin frame was cooled, the molding die was opened to remove the resin frame integrated with the entire backside periphery of the flat plate. A digital audio player housing case of 90 mm in length, 40 mm in width, and 4 mm in height with the corners rounded at a radius R of 1 mm was thus obtained.

EXAMPLE 2

A glass plate of 88 mm in length, 38 mm in width, and 1 mm in thickness was prepared, and a circular opening for an operation panel was provided in the glass plate. A decorative layer/adhesive layer for glass was then formed on one side of the glass plate except a display window for a liquid crystal screen by using screen printing along with an ink containing a coloring agent and a polyester resin as a binder. A primer layer made of a polyester resin and an adhesive layer for resin made of a vinyl chloride/vinyl acetate/acrylic resin were then sequentially formed on the entire periphery of the decorated side of the glass plate by using screen printing. A flat plate was thus obtained.

The flat plate was introduced into the molding die comprising the movable die and the stationary die, and secured in a predetermined position on the cavity surface through vacuum suction. After the molding die was closed, a molten polyacrylic resin was injected through the gate to fill the cavity. A rectangular resin frame was formed, and at the same time the resin frame was bonded to the decorated surface of the flat plate with the adhesive layer for resin and the primer layer interposed between the resin frame and the decorated surface of the flat plate. After the resin frame was cooled, the molding die was opened to remove the resin frame integrated with the entire backside periphery of the flat plate. A digital audio player housing case of 90 mm in length, 40 mm in width, and 4 mm in height with the corners rounded at a radius of 1 mm was thus obtained.

EXAMPLE 3

Example 3 only differs from Example 1 in that the adhesive layer for glass, the primer layer, and the adhesive layer for resin were sequentially formed on not only the periphery of the glass plate but also the entire surrounding portion of the opening in the undecorated surface of the flat plate to form a flat plate; a rectangular resin frame and a circular opening resin frame were formed by using injection molding; and at the same time, the resin frame and the opening resin frame were bonded to the undecorated surface of the flat plate with the adhesive layer for resin, the primer layer, the adhesive layer for glass interposed between the resin frames and the undecorated surface of the flat plate.

EXAMPLE 4

Example 4 only differs from Example 2 in that the primer layer and the adhesive layer for resin were sequentially formed on not only the periphery of the glass plate but also the entire surrounding portion of the opening in the decorated surface of the flat plate to form a flat plate; a rectangular resin frame and a circular opening resin frame were formed by using injection molding; and at the same time, the resin frame and the opening resin frame were bonded to the decorated surface of the flat plate with the adhesive layer for resin and the primer layer interposed between the resin frames and the decorated surface of the flat plate.

EXAMPLE 5

Example 5 only differs from Example 3 in that the resin frame is divided into two.

EXAMPLE 6

Example 6 only differs from Example 4 in that each of the resin frame and the opening resin frame is divided into two.

EXAMPLE 7

A glass plate of 88 mm in length, 38 mm in width, and 1 mm in thickness was prepared, and a circular opening for an operation panel was provided in the glass plate. A decoration layer was then formed on one side of the glass plate except a display window for a liquid crystal screen by using screen printing along with an ink containing a coloring agent and a polyester resin as a binder. An adhesive layer for glass made of a polyester resin, a primer layer made of a polyester resin, and an adhesive layer for resin made of a vinyl chloride/vinyl acetate/acrylic resin were then sequentially formed on the entire periphery of the undecorated side of the glass plate by using screen printing. A flat plate was thus obtained.

In this case, the glass insert molding die of the invention described above was used. After the sliding core was moved to the flat plate positioning position, the flat plate was placed on the surface of the stationary die where the flat plate was sandwiched, and the positioned flat plate was suctioned by suctioning air through the suction holes and secured on the surface where the flat plate to be sandwiched. After the stationary die to which the flat plate had adhered and the movable die were closed, and the sliding core was moved to the cavity forming position, a molten resin was injected into the cavity to integrate the flat plate with a resin frame. After the die was opened, the sliding core was moved to the glass insert mold pushing position and the glass insert mold was removed. A digital audio player housing case of 90 mm in length, 40 mm in width, and 4 mm in height with the corners rounded at a radius of 1 mm was thus obtained.

EXAMPLE 8

A glass plate of 88 mm in length, 38 mm in width, and 1 mm in thickness was prepared, and a circular opening for an operation panel was provided in the glass plate. A decorative layer/adhesive layer for glass was then formed on one side of the glass plate except a display window for a liquid crystal screen by using screen printing along with an ink containing a coloring agent and a polyester resin as a binder. A primer layer made of a polyester resin and an adhesive layer for resin made of a vinyl chloride/vinyl acetate/acrylic resin were then sequentially formed on the entire periphery of the decorated side of the glass plate by using screen printing. A flat plate was thus obtained.

The glass insert molding was performed in the same manner as Example 7, and a digital audio player housing case of 90 mm in length, 40 mm in width, and 4 mm in height with the corners rounded at a radius of 1 mm was obtained.

For all the housing cases of Examples 1 to 8, the front portion of the case, in particular, the portion that covers the display screen, such as an LCD, was adequately hardened.

INDUSTRIAL APPLICABILITY

The invention is preferably applicable to a housing case, for example, for a small electric device and communication device, a method for manufacturing the housing case, and a glass insert molding die used in the same.

The invention claimed is:

1. A glass insert molding die comprising a stationary die and a movable die that sandwich a flat plate primarily comprising a glass plate when the dies are closed, and form a cavity that faces a periphery of the flat plate facing the stationary die and also an end surface of the flat plate, wherein
  the stationary die includes a sliding core having a bottom portion that comes into contact with the periphery of the flat plate facing the stationary die and a wall portion that is connected to the bottom portion and positionably comes into contact with the end surface of the flat plate, the bottom portion and the wall portion provided at the front end of the sliding core, and
  a suction hole provided in the surface where the flat plate is sandwiched; and
  the sliding core is capable of being advanced and retracted in a die-closing direction between a flat plate positioning position and a cavity forming position, the flat plate positioning position being the position where the front-end bottom portion does not protrude from the surface of the stationary die where the flat plate is sandwiched but the front-end wall portion comes into contact with the flat plate, and the cavity forming position being the position where the front-end bottom portion and the front-end wall portion are separated from the flat plate.

2. The glass insert molding die according to claim 1, wherein the sliding core is partially provided along a perimeter of the flat plate.

3. The glass insert molding die according to claim 1, wherein the sliding core is further capable of being advanced to a glass insert mold pushing position where the front-end bottom portion protrudes from the surface of the stationary die where the flat plate is sandwiched.

4. A method for manufacturing a housing case using the glass insert molding die according to claim 1, the method comprising the steps of:
  moving the sliding core to the flat plate positioning position and then placing the flat plate on the surface of the stationary die where the flat plate is sandwiched;
  suctioning and securing the positioned flat plate on the surface where the flat plate is sandwiched;
  closing the stationary die to which the flat plate has adhered, and the movable die; and
  after the dies are closed, moving the sliding core to the cavity forming position and then injecting a molten resin into a cavity to integrate a resin frame with the flat plate.

5. A method for manufacturing a housing case using the glass insert molding die according to claim 3, the method comprising the steps of:

- moving the sliding core to the flat plate positioning position and then placing the flat plate on the surface of the stationary die where the flat plate is sandwiched;
- suctioning and securing the positioned flat plate on the surface where the flat plate is sandwiched;
- closing the stationary die to which the flat plate has adhered, and the movable die;
- after the dies are closed, moving the sliding core to the cavity forming position and then injecting a molten resin into a cavity to integrate a resin frame with the flat plate; and
- opening the dies and then moving the sliding core to the glass insert mold pushing position.

6. The method for manufacturing a housing case according to claim 4,
wherein the flat plate has decoration on the glass plate.

7. The method for manufacturing a housing case according to claim 4,
wherein the flat plate has an adhesive layer for glass, a primer layer, and an adhesive layer for resin sequentially formed on the glass plate.

8. The method for manufacturing a housing case according to claim 4,
wherein the portion where the flat plate is sandwiched between the stationary die and the movable die has an opening.

9. The method for manufacturing a housing case according to claim 4,
wherein the material of the molten resin has a molding shrinkage rate of 0.6% or lower.

10. The glass insert molding die according to claim 1,
further comprising simultaneous molding/painting means that allows a transfer film to be sandwiched between the stationary die to which the flat plate has adhered and the movable die.

11. The method for manufacturing a housing case according to claim 4,
further comprising the step of sandwiching a transfer film between the stationary die to which the flat plate has adhered and the movable die,
wherein a painting portion of the transfer film is transferred to the resin frame integrated with the flat plate simultaneously with injection of the molten resin.

* * * * *